United States Patent [19]

Barben et al.

[11] Patent Number: 5,027,509
[45] Date of Patent: Jul. 2, 1991

[54] METHOD FOR MANUFACTURING A TOOL CYLINDER

[75] Inventors: Martin Barben, Spiez/Wiler; Kuno Grolimund, Renens, both of Switzerland

[73] Assignee: Bobst S. A., Switzerland

[21] Appl. No.: 507,790

[22] Filed: Apr. 12, 1990

[30] Foreign Application Priority Data

Apr. 14, 1989 [CH] Switzerland ............... 01416/89

[51] Int. Cl.⁵ ............................................. B23P 19/00
[52] U.S. Cl. ................................. 29/895.3; 29/407; 76/107.8; 83/343
[58] Field of Search ................. 29/895, 895.2, 895.21, 29/895.213, 895.23, 895.3, 895.31, 525.1, 445, 407, 703; 83/659, 698, 346, 344, 343; 76/107.8

[56] References Cited

U.S. PATENT DOCUMENTS

| | | | |
|---|---|---|---|
| 145,941 | 12/1873 | Gray | 83/346 |
| 3,744,384 | 7/1973 | Jarritt et al. | 76/107.8 |
| 3,954,034 | 5/1976 | Broderick | 83/659 |
| 4,343,215 | 8/1982 | Fuchs | 83/698 |
| 4,598,456 | 7/1986 | McConnell | 29/703 |
| 4,617,714 | 10/1986 | Kori et al. | 29/895.3 |
| 4,787,136 | 11/1988 | Majic | 29/703 |
| 4,848,190 | 7/1989 | Doslik et al. | 76/107.8 |
| 4,860,616 | 8/1989 | Smith | 76/107.8 |

*Primary Examiner*—P. W. Echols
*Assistant Examiner*—David P. Bryant
*Attorney, Agent, or Firm*—Hill, Van Santen, Steadman & Simpson

[57] ABSTRACT

A tool cylinder, whether it is a cutting cylinder or a counter-cylinder, is formed by a carrier cylinder having an outer shell formed by a plurality of segments arranged on the cutting cylinder. The outer surface of the shell formed by the segments in a gap-free manner is machined to provide the desired shape. If the tool cylinder is a cutting tool cylinder, this includes a cylindrical surface with a pattern of knife blades extending radially from the cylindrical surface. If the tool cylinder is a counter-cylinder, this includes a smooth cylindrical surface.

8 Claims, 2 Drawing Sheets

METHOD FOR MANUFACTURING A TOOL CYLINDER

BACKGROUND OF THE INVENTION

The present invention is directed to a tool cylinder belonging to a rotary machine for processing continuously at high speeds a web-like or sheet-like workpiece, such as, for instance, sheets of boards for the manufacture of packaging boxes. The particular operation referred to consists in forming a box blank out of a pre-printed sheet and this blank is then subsequently folded and glued so as to become a definite box.

For quality boxes, one clearly thinks of boxes containing the product and also serving as a publicity support and brand image of the product contained in the box. This is the case for the flip-top type cigarette boxes for luxurious cigarettes which are semi-rigid boxes of which the top bends backward in order to render the cigarettes very accessible. In order to obtain a quality product, it is easily understandable that every intermediate operation requires the same care. The creasing operation for preparing the future folding lines, for example, needs to be thin and precisely located with regard to the imprinted motif or printed pattern of the box. The cutting operation not only has to be accurate, but also neat in order not to leave any blurred or rough edges along the sides, as well as in the slightest corners. It is, thus, a primary importance to manufacture a male tool cylinder for cutting or creasing and a joint smooth counter-cylinder, both of a good quality and for performing such operations.

For the manufacture of liquid containers, cutting tool cylinders are presently well known. These cylinders comprise a carrying cylinder with grooves which engage one or several bases adapted as a portion of a hollow cylinder, which bases are provided with segments which the outer surfaces have been machined so as to have cutting blades. The position of the base on the carrying cylinder is fixed by means of catches or projections which are situated within the base and are set into grooves. The position of the segments on the base is given by bolts either running through these segments in order to be screwed into the base or crossing simultaneously the segments and the base in order to be threaded into the threadings of the carrying or carrier cylinder. The advantage of this device is that the segments are interchangeable. In other words, it is easy to change the shape of the liquid container, for example to modify its capacity by substituting, adding or taking away standard segments from the bases.

However, the accuracy of the position of the segments with regard to one another and to the pre-printed sheets seems to be unsatisfactory for finer jobs. These imprecisions or imperfections are caused, on the one hand, by the accumulated positioning errors of the bases with regard to the carrying cylinders and of the segments with regard to the bases. These imperfections are caused, on the other hand, by the fact that the segments are obtained independently from one another. An important offset is frequently noticed between two knives forming a right angle at the joining point of two segments. The outer diameter of the carrying cylinder can then be too small with regard to the total diameter of the tool cylinder, which situation can impair the rigidity of the assembly. Moreover, the setting of the position of the knives on every segment, as well as the position of the segment with regard to one another, is actually very time consuming and a tedious operation. In fact, standard segments are used as much as possible for the composition of complex diamond-shaped or star-shaped knives. Finally, taking into account the important number of segments used for the realization of an entire tool cylinder, their best possible setting becomes also long and tedious.

When even more precision is required for a very particular application, monobloc cylinders are directly engraved, preferably by electro-erosion. As may be gathered, the main drawback of this procedure consists in the very difficult correction of an error and the restoration of a broken knife. To this effect, it will be necessary to overlay the appropriate area with welded metal and to sharpen it by hand. Obviously, if the damage occurs with the monobloc cylinder installed in the machine, this requires a long and tedious restoration, which will cause the production from this machine to be in an undue down time.

Moreover, bending stresses which occur within the tool cylinder and which are associated with the counter-cylinder may cause resonance effects with high speed rotation inducing an uneven contact line between the tool cylinder and its counter-cylinder. In other words, it is frequent that neat cuts will appear at the two lateral ends of the cylinder but only partial cuts will be in the center area. In such a case, it will be necessary to bring both tool cylinders closer to one another, which causes a quick deterioration of the knives in the area adjacent the lateral ends where the overpressure will occur.

SUMMARY OF THE INVENTION

The present invention is to provide a tool cylinder with a much improved dimensional precision. The structure of such a cylinder allows the manual correction of radial position or even easy restoration or replacement of the possibly defective constituent parts without impairing the above-mentioned characteristics. Finally, the elaboration and realization of the process for such a tool for every possible type or shape of box to be manufactured should be facilitated and kept at a low cost, especially by appropriate use of computer means and of digital control tools, thus reducing adequately the conception and manufacturing times.

In order to accomplish these goals, the present invention is directed to a method for manufacturing a tool cylinder situated in a rotary machine processing web-like and plate-like workpieces, said tool cylinder including segments fitted on a carrier cylinder, the method comprising the steps of providing a carrier cylinder having an outer cylindrical surface of a first radius; providing a plurality of segments; machining each of the segments to form precisely machined concave inner surfaces of said first radius, precisely machined edges and a rough outer surface; assembling the segments on said carrier cylinder to form a new rough outer surface for the cylinder and then subsequently machining the rough outer surface of the cylinder to the desired shape. If the tool cylinder is a cutting cylinder, the knives are cut into the cylindrical surface formed by all of the outer surfaces of the segments fitted on the carrier cylinder. The cutting of the knives is preferably achieved with a digitally-controlled machine, including means for storing data which has been loaded with the data concerning the position of the knives on the cylindrical surface.

According to a second mode of the execution of the invention, the object is to form the smooth counter-cylinder, in which the cylindrical surface formed by all of the outer surfaces of the segments, which are fitted on the carrier cylinder, is machined to the desired smooth cylindrical surface of the second radius. When put to work, the cylindrical surface of the smooth counter-cylinder is usefully corrected with regard to the cutting tool cylinder by inserting underneath one or several metal pads or by applying a thin liquid self-hardening coating beneath one or several of the related segments to cause a slight increase in the radius of the machined outer surface at that location.

A segment for the implementation of the process preferably has a general shape of a rectangular portion of a hollow cylinder, of which the axis merges with the axis of the carrying cylinder. The rectangular portion will have two parallel sides which extend parallel to the axis of the cylinder and will have an inner surface corresponding to the cylindrical surface of the first radius of the carrier cylinder and have an outer surface which is rough and shown as a section crosswise of the carrying cylinder axis and has a shape of regular polygonal portions having an outer diameter of the specified tool cylinder.

As may be easily gathered, the process, according to the invention, is particularly interesting because it allows the tool cylinder to be precisely machined.

The invention is also directed to a tool cylinder having an outer surface formed by a plurality of cylinder segments having an outer surface machined to the desired configuration and to the segments for use in preparing such a cylinder.

Other advantages and features of the invention will be readily apparent from the following description of the preferred embodiments, the drawings and claims.

DESCRIPTION OF THE PREFERRED EMBODIMENTS

Figure 1:
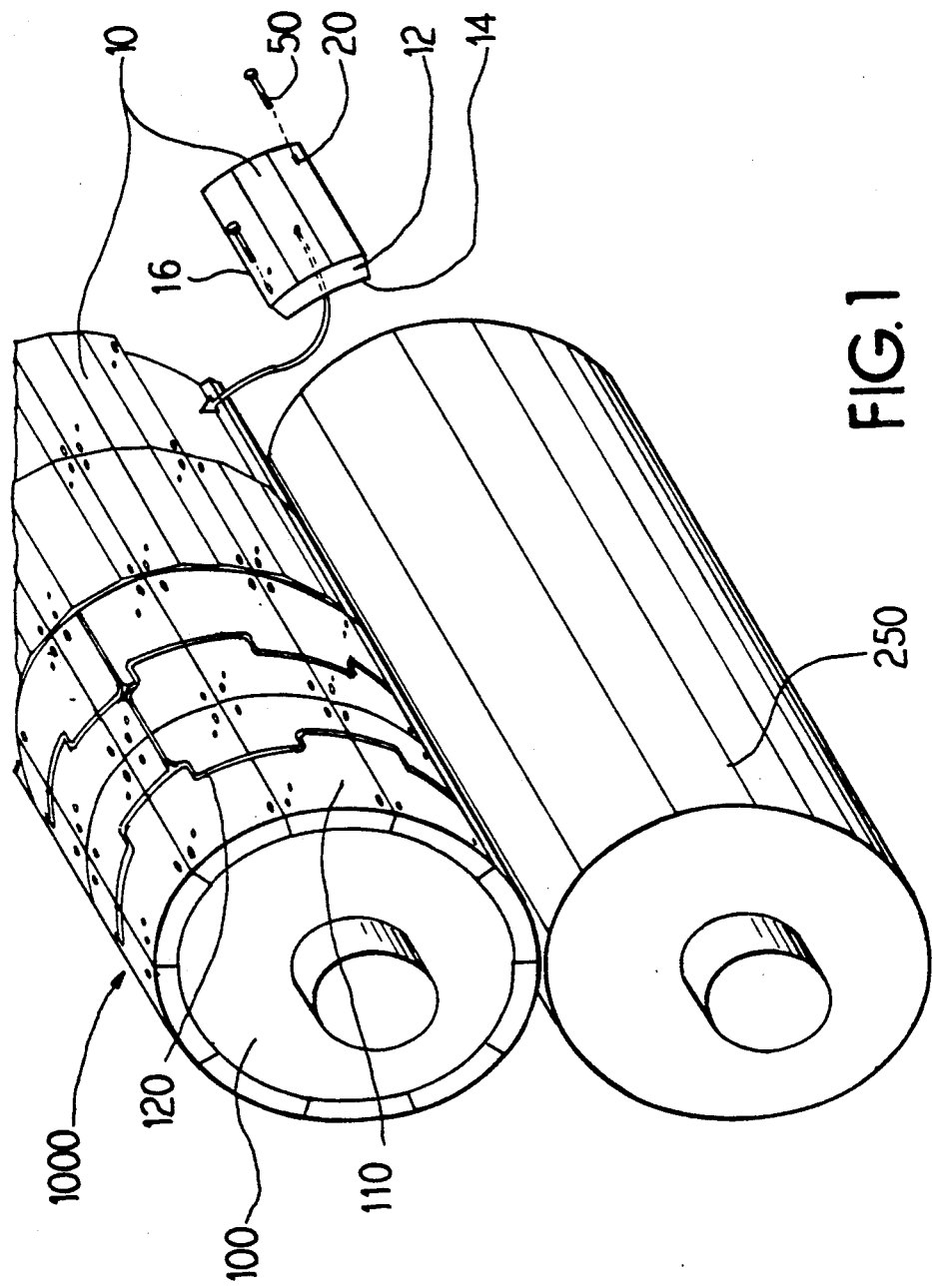
FIG. 1 is a perspective view illustrating an upper cutting tool cylinder according to the present invention associated with a lower smooth standard counter-cylinder with the left-hand portion of the cutting cylinder being machined to the desired configurations and the right-hand portion of the cutting cylinder having the segments in the rough surface configuration before machining.

The principles of the present invention are particularly useful when incorporated in a cutting cylinder, generally indicated at 1000 in FIG. 1, which includes a supporting shaft or carrier cylinder 100 covered by an assembly of segments 10 in their rough shape, which are machined into final segments 110 after assembly. The cutting cylinder 1000 is used with an associated smooth counter-cylinder 250, which is of the usual construction.

As may be clearly gathered from the right-hand side of FIG. 1, a segment 10 has a general shape of a rectangular plate arranged lengthwise with regard to the carrier cylinder and bent according to the radius of the carrier cylinder 100. In other words, the carrier or carrying cylinder 100 has an outer cylindrical surface of a first radius. Each of the segments 10 is a portion of a hollow cylinder which has an inner cylindrical surface of a radius that is equal to the first radius of the carrying cylinder 100 and which hollow cylinder has an the outer cylindrical surface that is at least bigger than an outer cylindrical surface of a second, larger radius, which is the radius of the outer surface of the cylinder 1000.

When the segment 10 is applied against its carrying cylinder 100, a lengthwise face or edge 16 is included in a radially extending plane which crosses the axis of the cylinder, whereas a lateral face or edge 12 is included in a plane which extends at right angles or perpendicular to the axis of the cylinder 100. The number of segments is preferably determined according to the geometry of the boxes to be processed and, thus, rendered evident that several box blanks can be located on the draw-sheet and on the periphery. As a non-limitative example, the carrying cylinder 100 has an outer diameter equal to about 30 cm, the planes defining the lengthwise faces 16 of the segments 10 intersect each other on the cylindrical axis with an angle of about 36°, which arrangement, as envisioned in this particular case, has about ten segments in order to cover the cylinder throughout its periphery.

On account of the outer surface of this segment 10 being considered as rough, the surface need not be precisely cylindrical. Therefore, it is much easier and quicker to machine an outer surface, shown in cross section with lengthwise sides, as illustrated in FIG. 1. Thus, the outer surface of each of the segments 10 has a shape of regular polygonal portions having a diameter at least the outer diameter of a future specified tool cylinder and can be described as being formed by strip-like portions that are cords of a cylinder.

Figure 2:
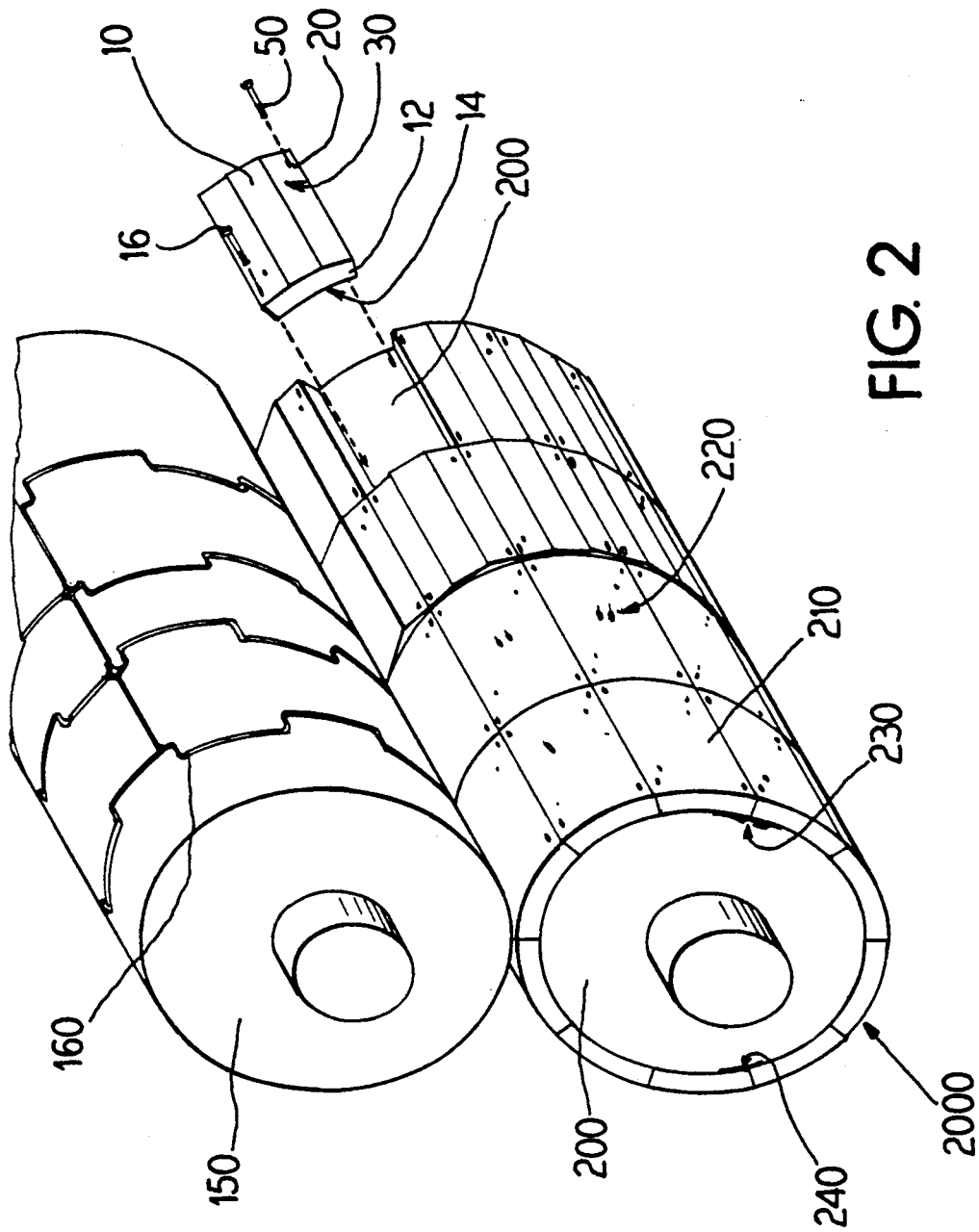
FIG. 2 is a perspective view of an upper standard cutting tool cylinder associated with a lower smooth counter-cylinder according to the present invention with the counter-cylinder having a left-hand portion being smoothly machined and the left-hand portion having the rough surface prior to the machining of the counter-cylinder.

The principles of the present invention are also useful in forming a counter-cylinder, generally indicated at 2000 in FIG.. 2. As illustrated in FIG. 2, a cutting cylinder 150 is of a standard monobloc type and includes knives 160 on its cylindrical surface. A lower or smooth counter-cylinder, generally indicated at 2000, is formed in accordance with the present invention and includes a supporting shaft or carrier cylinder 200 covered with another assembly of segments 10 in their rough shape, which have been subsequently machined into segments 210 and completed, if need be, provided with stripping pins 220. A segment 10 is also represented in the right-hand side of the Figure as partially removed from the counter-cylinder.

As described hereinbefore, the tool cylinders are realized in the following way.

An adequate number of the segments 10 are, first, provided and then are machined in order to build up a first assembly allowing at least a total covering of the carrying cylinder 100 or the second carrier or carrying cylinder 200. In addition, a number are machined for future spare parts or for doubling the total number of initial segments. An inner surface 14 of each of the segments is machined in a very precise manner to have a concave surface which is a part of a cylindrical surface having a first radius which corresponds to the first radius of either the carrier cylinder 100 or 200. In addition, the lateral faces 16 as well as the end faces of each of the segments are machined to be precisely fitting. Fastening apertures 20 are drilled in every one of the four corners, as well as if it is a counter-cylinder two threaded bores 30. If the segments are destined to be fitted on a counter-cylinder provided with stripping pins 220, one or several of the apertures are provided for mounting these pins. Every segment is finally engraved with a reference describing the segments future position on its carrying cylinder. This reference can be completed with several numbers and/or an indication regarding its hardness.

Once the segments 10 have been provided and machined, they are arranged jointly on their carrier cylinders 100 and 200 by means of bolts 50, which extend through the apertures 20 and are engaged in their corresponding tapped bores in the carrying cylinder. On account of the precautions taken, especially during the machining of the inner surface and the lateral surfaces or edges of each of the segments, the assembly of the supporting cylinder results in a gap-free puzzle composition, which builds up a new continuous outer cylindrical-like surface, which is a rough surface.

In order to realize a smooth counter-cylinder 2000, the operator places the covered carrying cylinder 200 on a machining device, and this machined tool will reshape the new outer polygonal surface into a smooth cylindrical surface provided with the outer dimensions determined on the basis of the type of blank to be processed. The realization will be achieved by installing the stripping pins 220 in the particular bores 30.

In order to obtain the cutting tool cylinder 1000, the process is similar to the one for the monobloc cylinder, i.e., the carrying cylinder 100 which is covered with the segments 10 having the rough outer surface is placed on a finishing machine or machining tool. It is preferable to use a machining tool with a digital control including means for storing data which has been loaded with the data concerning the particular job to be accomplished. The technician will then be able to program this machining tool according to a specific plan for the knife positions on the whole tool cylinder.

With such a procedure, the machining tool will no longer take into account the existence of segment limits and will proceed to cut a knife in a continuous way with one segment to the other. Conspicuously, the technician will make sure that no position of a knife will fall on a gap between adjacent segments.

A possible second set or entire assembly of segments required for covering the whole of the supporting shaft or carrying cylinder 100 can also be realized in a similar fashion. As a variant, replacement segments are manufactured only for the segments known to have the highest amount of deterioration. To this aim, the roughcast pieces are installed on the carrying cylinder 100 with pads or lesser thicknesses so that the position of the roughcast remains identical. The digital control and machine tool then allows these roughcasts to be machined with the same precision.

The cutting tool cylinder 1000 is arranged in the rotary machine, as shown in FIG. 1, and sheet or board cutting test can be obtained. Should a major defect occur or should a knife break later on, the position of the defective knife, as well as its reference, can easily be identified by consulting the result of the test sheet. The corresponding segment 10 can then be unscrewed and released by means of tools engaged in the threaded apertures 30, which are especially designed for this purpose. This segment is either replaced by an individual piece, if the latter exists, or the segment can be remachined in the workshop. As may be gathered, the repair of the cutting tool cylinder does not necessitate according to the invention, the unfitting or dismantling of the total tool cylinder, but only a small, easily accessible part.

In the same way, the smooth cylinder 2000 is arranged in a rotary machine, either with a conventional cutting tool cylinder, as shown in FIG. 2, or with a cutting tool cylinder 1000 according to the invention. Tests can then be run.

The most probable test result shows that one of the knives does not cut adequately. Rather than replace the knife, it might be more appropriate to regulate the radial position of one or several of the corresponding segments 210 of the counter-cylinder 2000 by raising their radial position. As mentioned before, the segments 210 are deductively located by reading the results of the test sheet. Depending on the importance of the damage, one or several segments can be provisionally released in order to interpose one or several thick pads 230 between the segments 210 and the carrier cylinder 200. These pads can consist of a soft steel web with a predetermined thickness of, for instance 1/100 to 2/100 millimeters. Plant tests have proved that corrections lower than 1/100 millimeters are possible by using tissue paper or by spraying on a thin lacquer 240. The smooth segments 210 are then fastened back in their desired position with the threaded fasteners 50.

As may be gathered through the above description, it is not necessary, according to the process, to establish a detailed plane for every segment differing from a cutting tool cylinder, but only one plane for a general position of the knives of the cylinder. In addition, this plane could be digitally interpreted and entered into the machine with a digital control. The desired positioning quality and cutting accuracy are then achieved, on the one hand, by reducing by one level the number of layers of pieces fitted on the carrying cylinder and, thus, allows an increase in the latter diameter and, on the other hand, by cutting the respective knives 120 in a continuous mode. The use of such a computer means for the conception of the tool has surprisingly proved to reduce slightly the number of necessary segments 10.

The essential elements of the present invention are that the segments form a gap-free, puzzle-like composition on the carrying cylinder. It is easily understandable that, by comparison to the segments illustrated in the drawings, other shapes of the cylindrical portion could be possible for these segments 10, such as rectangular ones in a crosswise direction of the cylinder, as well as diamond or differently shaped elements. The outer surfaces of each of the segments 10 mentioned as polygonal can also be cylindrical or of any other convex shape, as long as the volume created by the assembly of the segments 10 in their rough shape covers the volume of the future specified tool cylinder.

The concept of the invention also allows for considerable numerous other improvements to be added to the tool cylinder and to its process of manufacture.

Although various minor modifications may be suggested by those versed in the art, it should be understood that we wish to embody within the scope of the patent granted hereon all such modifications as reasonably and properly come within the scope of our contribution to the art.

We claim

1. A method for manufacturing a tool cylinder situated in a rotary machine for processing web-like and plate-like workpieces, said tool cylinder including segments fitted on a carrier cylinder, the method comprising the steps of providing a carrier cylinder having an outer cylindrical, smooth surface of a first radius; providing a plurality of segments; machining each of the segments to form a segment with a precisely machined concave inner surface of said first radius, precisely machined edges and a rough outer surface; assembling the segments on said carrier cylinder with the concave inner surfaces engaging the smooth surface to form a new rough outer surface for the cylinder without any gaps between segments; and then machining the rough outer surface of the cylinder to the desired shape.

2. A method according to claim 1, wherein the tool cylinder is a cutting tool cylinder and said method of machining the rough outer surface of the cylinder to the desired shape includes machining knives into the outer cylindrical surface of the segments mounted on the carrier cylinder.

3. A method according to claim 2, wherein the step of machining the knives into the outer cylindrical surface formed by said segments includes utilizing a digitally controlled machine having means for storing data which is loaded with the data concerning the position of the knives on the cylindrical surface.

4. A method according to claim 1, wherein the tool cylinder is a smooth counter-cylinder and said step of machining the rough outer surface of the cylinder to the desired shape machines the outer surface to a smooth cylindrical surface.

5. A method according to claim 4, which further includes, subsequent to machining the outer surface, running a test sheet between the counter cylinder and its corresponding cutting cylinder and then selectively increasing the radial distance of the surface portions of the segments from the axis of the counter-cylinder by inserting a layer of material between the smooth surface of the carrier cylinder and the inner surface of the selected segments.

6. A method according to claim 4, which includes testing by passing a test sheet between the counter-cylinder and a corresponding cutting cylinder and subsequently correcting the radial distance of the surface portions of the segments from the axis of the counter-cylinder by removing said segments, applying a thin layer of self-hardening material on the smooth surface of the carrier cylinder and subsequently replacing the removed segments.

7. A method according to claim 1, which further includes, subsequent to machining the rough surface to the desired shape, removing selected segments, applying a thin layer of self-hardening liquid on the smooth surface of the carrier cylinder and then subsequently replacing the removed segments in their original position so that the machine surface of the segment has a slightly greater radial distance from the axis of the cylinder than the remaining segments.

8. A method according to claim 1, which includes, subsequent to machining the rough surfaces of the segments to the desired shapes, removing selected segments to expose the smooth surface of the carrier cylinder, inserting at least one layer of material on said smooth surface, replacing the removed segments so that the removed segments will have a radial distance from the axis of said tool cylinder slightly greater than the segments which were not removed.

* * * * *